Nov. 20, 1923.
A. B. KENDALL
1,474,836
COMBINED RESERVOIR AND BRAKE VALVE
Filed Nov. 10, 1922
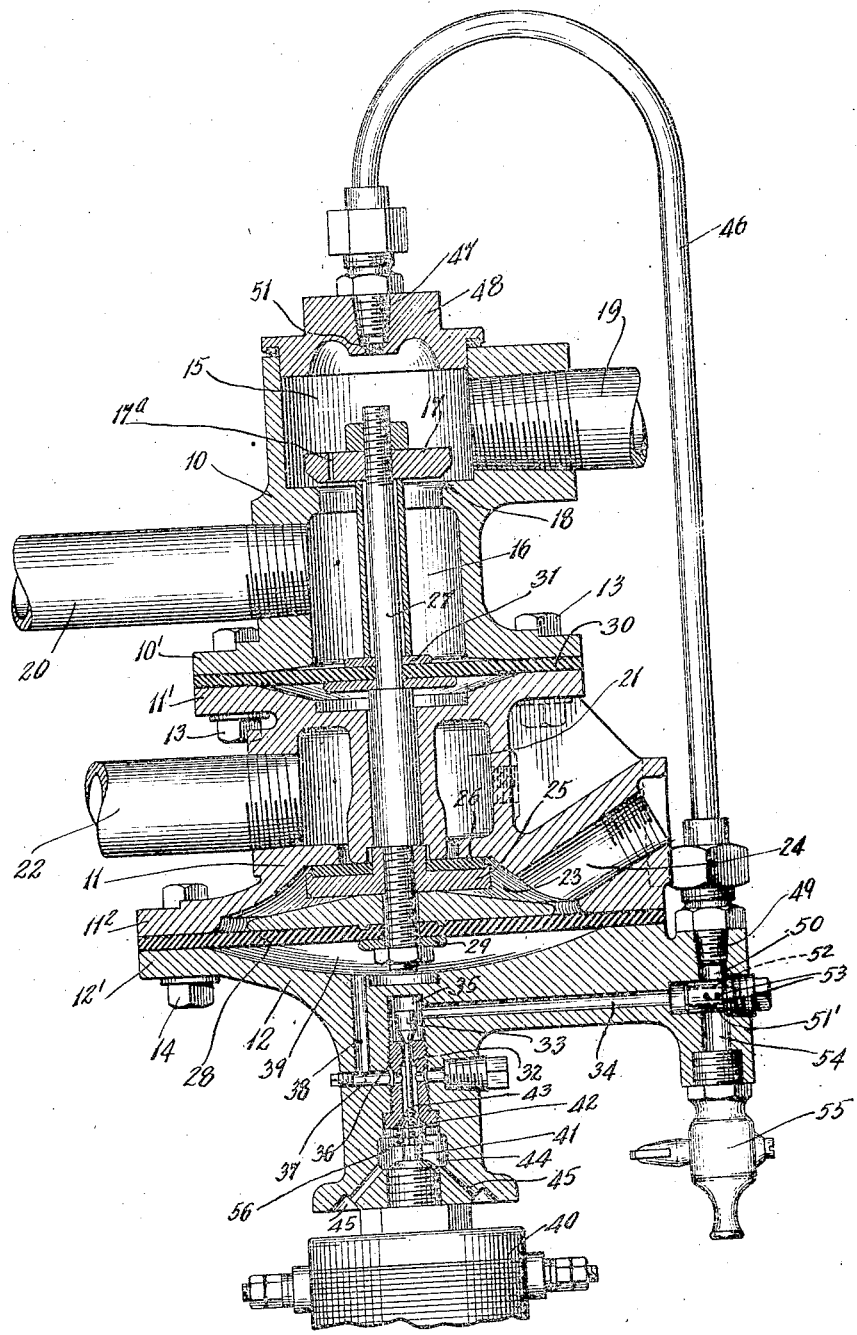
INVENTOR
Allen B. Kendall
BY
Meyers, Cavanagh & Whitehead
ATTORNEYS Patented Nov. 20, 1923.

1,474,836

UNITED STATES PATENT OFFICE.

ALLEN B. KENDALL, OF NIAGARA FALLS, NEW YORK, ASSIGNOR TO THE REGAN SAFETY DEVICES COMPANY, INC., OF NEW YORK, N. Y., A CORPORATION OF NEW YORK.

COMBINED RESERVOIR AND BRAKE VALVE.

Application filed November 10 1922. Serial No. 600,018.

*To all whom it may concern:*

Be it known that I, ALLEN B. KENDALL, a citizen of the United States, and resident of Niagara Falls, in the county of Niagara and State of New York, have invented certain new and useful Improvements in Combined Reservoirs and Brake Valves, of which the following is a specification.

This invention relates to a train control apparatus, and more particularly to a combined reservoir and brake valve employed for controlling the flow of air from the main reservoir of the air brake system to the engineman's brake valve and for controlling the venting of the brake pipe of the train; and has special reference to the provision of an improved reservoir and brake valve of the type forming the subject-matter of my copending application Serial Number 443,046 of Feb. 7, 1921.

The prime-desideratum of my present invention comprehends the provision of a combined reservoir and brake valve in which the parts are constructionally so relatively arranged and functionally so inter-related as to provide a device capable of efficient operation for an indefinite period of time.

In the combined reservoir and brake valve of my invention, there is provided valve mechanism for controlling the flow of air from the main reservoir to the engineman's brake valve and the flow of air from the brake pipe of the air brake system which valve mechanism is operated by a pneumatic mechanism including provisions for conducting a flow of air from the reservoir to a pneumatically actuated device such as a diaphragm, the said flow of air being controlled by a primary valve which is automatically operated by an electro-responsive device such as an electromagnet. It has been found in actual service that in the operation of this combined reservoir and brake valve scale and other impurities present in the air coming from the main reservoir and conducted to actuate the diaphragm collect at the seats of the primary valve, ofttimes interfering with the effective operation thereof. To obviate this objection, and to provide a construction in which the parts are so inter-related as to minimize, if not entirely eliminate, the collection of impurities on the said primary valve is a principal object of the present invention.

It has been further found in actual service that there is a tendency for condensed moisture as well as impurities to find its way to the primary valve and to become deposited upon the electromagnet means which operates the primary valve, the moisture and impurities being discharged upon the electro-magnet under certain conditions of operation of the valve. Another principal object of the present invention therefore resides in the provision of an improved construction in which this objection is obviated, and in which the discharge is deflected from the electromagnet to maintain the integrity of the latter.

The principal objects of the present invention may therefore be said to include, besides the provision of an improved reservoir and brake valve having the characteristics and capable of performing the functions above enumerated; the further provision of a combined reservoir and brake valve in which the provisions for conducting the flow of air from the reservoir to the diaphragm is so connected to the reservoir lines as to minimize any tendency of dirt and other foreign matter from having access thereto; the further provision of a reservoir and brake valve of this nature in which the provisions for conducting air to the diaphragm includes means for filtering the air flowing therethrough and to the primary valve, so that any moisture condensing in the said conducting provisions will be caused to collect therein, and to minimize the collection of such moisture at the seat of the primary valve; and the still further provision of an apparatus of this nature in which any moisture collecting at the primary valve is discharged therefrom in such a manner as not to interfere with the operation of the electromagnet controlling the said valve, and so as to maintain the said electromagnet in proper condition.

To the accomplishment of the foregoing and such other objects as may hereinafter appear, my invention consists in the elements and their relation one to the other, as hereinafter more particularly described and sought to be defined in the claims; reference being had to the accompanying drawing which shows a preferred embodiment of my invention, and in which:

The figure is a cross-sectional elevational view of my improved reservoir and brake valve.

Referring now more in detail to the drawings, the preferred construction of my improved reservoir and brake valve comprises a valve casing provided with an upper section 10, an intermediate section 11, and a lower section 12, the sections 10 and 11 being secured together as by attaching the flanges 10' and 11' of said sections by means of securing elements such as the bolts 13, and the intermediate and the bottom sections 11 and 12 being secured together as by attaching the flanges 11² and 12' thereof by means of the securing elements such as the bolts 14.

The upper section 10 is provided with the intercommunicating chambers 15 and 16 the intercommunication between which is controlled by a valve including the valve head 17 and the valve seat 18 therefor, the chamber 15 comprising a pressure chamber which is adapted to be connected to the main reservoir of an airbrake system by means of the pipe 19, the chamber 16 being in turn adapted to be connected to the engineman's brake valve by means of the connecting pipe 20, the upper section 10 thus providing means for controlling the flow of air from the main reservoir to the engineman's brake valve. The valve head 17 is in the present construction preferably provided with a vent hole 17ª which functions to prevent the unseating of the engineman's brake valve when the valve head 17 is moved to seated position, this hole being so restricted in area as to prevent any such flow of air as would enable the engineman to release the brakes or to prevent to any unsafe degree the automatic exhaust of the brake pipe of the train.

The section 11 is provided with a chamber 21 adapted to be connected to the brake pipe of the air brake system by means of the pipe 22, and with a chamber 23 provided with a vent 24, the said chambers 21 and 23 comprising intercommunicating chambers, the intercommunication between which is controlled by a brake valve including the valve head 25 and the valve seat 26 therefor, these parts forming the means for controlling the opening and closing of the brake pipe of the air brake system to exhaust.

In the preferred construction as shown in the figure, the reservoir valve and the brake valve are arranged to be operated in unison, and the valve heads 17 and 25 are to this end preferably connected to a unitary valve stem such as 27, the said valve heads 17 and 25 being attached to the opposite ends of said stem. The valves 17—18 and 25—26 are so interrelated that under normal conditions, as depicted in the figure, the reservoir valve 17—18 is normally open to permit the free flow of air from the reservoir line 19 to the line 20 running to the engineer's brake valve, and the brake valve 25—26 is normally closed to close the brake pipe 22 to atmosphere and so that when an application of the brakes is desired to be effected the reservoir valve 17—18 will be moved to closed position for shutting off communication between the main reservoir and the engineer's brake valve, and the brake valve 25—26 will be moved to open position to open communication between brake pipe 22 and the vent 24 so that the brake pipe is open to exhaust.

For operating the reservoir and brake valves in this manner there is provided a pneumatic mechanism which in the preferred construction includes a diaphragm 28 attached to the valve stem 27 at its lower end by means of the securing elements generally designated as 29, the said diaphragm 28 being interposed between the flanges 11² and 12' of the casing sections 11 and 12 and being bolted thereto by means of the bolts 14, the said pneumatic mechanism further including a diaphragm 30 interposed between the flanges 10' and 11' of the casing sections 10 and 11 and secured thereto, and attached to an intermediate portion of the valve stem 27 by means of the securing elements generally designated as 31, the said diaphragm 30 having a cross-sectional area smaller than that of the diaphragm 28, these diaphragms being actuated by pneumatic means to be described presently for controlling the movement of the valve stem 27 and the valve heads attached thereto.

For actuating and controlling the operation of the diaphragm 28, there is provided pneumatic elements which includes means for conducting air under pressure from the reservoir lines to influence the said diaphragm and valve means for controlling the flow of air from the reservoir to the said diaphragm, and to this end there is provided in the lower casing section 12 a primary valve generally designated as 32 provided with a valve head 33 for controlling the flow of air under pressure from a channel 34 to a chamber 35 through the valve port 36 and to and through the channels 37 and 38, the channel 38 opening into a chamber 39 provided below the diaphragm 28. Under normal conditions with the primary valve 32 in the position for opening the port 36 shown in the drawings, air under reservoir pressure is conducted from the channel 34 to the chamber 39, and is active on the diaphragm 28 to move and hold the valve parts to the position shown in the drawings.

For actuating the diaphragm 28, the primary valve 32 is operated so as to open and close communication between the channel 34 and the chamber 39 and so as to close and open the chamber 39 to exhaust; and to this end there is provided means comprising an electromagnet 40 carried by the valve casing section 12, the said electromagnet being provided with a core for operating the stem 41 which engages valve head 42 of the valve 32, the said valve head being provided for opening and closing a port 43 leading to the channel 37 to effect the opening or closing of communication between this channel 37 and a chamber 44 which is open to atmosphere by way of the discharge ducts 45. With this construction, it will be seen that when the electromagnet 40 is energized, the primary valve 32 is moved to ascended position as shown in the drawings, closing the chamber 39 to exhaust at the seat of the valve 42, and opening said chamber to reservoir pressure as hereinbefore described, by the unseating of the valve 33, and when the said electromagnet 40 is deenergized, the primary valve 32 is caused to descend, closing the chamber 39 to reservoir pressure and opening the same by way of the port 43 and the unseated valve 42 and ducts 45 to atmosphere. By this means when the valve 32 is moved to ascended position the pressure on the diaphragm acts to move the reservoir and brake valves upwardly as hereinbefore referred to, and when the valve 32 is moved to descended position pressure on the diaphragm 28 is relieved, and the weight of the valve parts together with pressure on the smaller diaphragm 30 of the air in the chamber 16 and the air pressure in the chamber 21 against the valve seat 16 causes the valve parts to descend for effecting the seating of the valve 17 and the unseating of the valve 25 to automatically apply the brakes and disconnect the engineman's brake valve from the main reservoir.

As hereinbefore referred to, it has been found in prior practice that there is a tendency for impurities present in the reservoir air to collect upon the parts of the primary valve 32 and to interfere with the effective operation thereof, a principal object of the present invention comprehending a construction in which this objection is effectively obviated. To this end I provide means for conducting the air under reservoir pressure from the reservoir lines to the primary valve 32 so that the ingress of impurities or other foreign matter into said conducting means will be effectively minimized. To accomplish this purpose, the conducting means comprises a pipe 46 of substantially inverted J form connected at one end to the pressure chamber 15 of the casing section 10 as by means of the threaded nipple 47 received by the correspondingly tapped bore in a cap 48 forming the roof of the chamber 15, and connected at its other end to the casing section 12 by means of the threaded nipple 49 received by a correspondingly threaded bore leading into a channel 50 communicating with the channel 34 in the casing section 12. The cap 48 of the pressure chamber 15 is further provided with a plurality of orifices 51 leading into the pipe 46, these orifices acting in the nature of a strainer for the reservoir air moving from the chamber 15 into the conducting pipe 46. By attaching the conducting pipe 46 to the roof of the chamber 15, I have found that the ingress of dirt or other foreign particles into the pipe 46 is substantially minimized so that the air flow to the primary valve 32 is substantially free from impurities.

As hereinbefore referred to, it has been found in actual service that there is a tendency for condensed moisture to collect at the seats of the primary valve, resulting not only in interfering with the proper activity thereof, but resulting in interfering with the proper behaviour of the electromagnet 40; and to obviate these objections a further principal object of the invention resides in the provision of a construction in which the tendency of collection of moisture at the valve seat is reduced, and the interference of said condensed moisture with the electromagnet effectively minimized. To these ends I provide in the line of connection between the source of reservoir air and the primary valve a filter or strainer which may comprise a plug 51' provided with a blind bore 52 therein and a plurality of perforations 53 in the side thereof, the said plug being preferably arranged in the casing section 12 between the channels 50 and 34 therein. This filter or strainer protects both as against moisture and impurities from entering the channel 34, the moisture condensing in the pipe section 46 collecting in a chamber 54 forming a continuation of the channel 50, this moisture condensation being removable by the opening of a cock 55 communicating with the chamber 54.

For the purpose of preventing any residual moisture collecting on the primary valve from moving through the stem 41 of the electromagnet and from being deposited on the bottom of the electromagnet when the primary valve is moved to effect a discharge of the air from the chamber 39, I provide a construction in which the discharge air is deflected from the electromagnet. To this end the discharge ducts 45 are arranged angularly at the lower end of the casing section 12 as shown, and the electromagnet stem 41 is provided with a flared element 56 of umbrella shape, this element functioning to deflect air discharging from the chamber 39 through the port 43 when the valve 42 is unseated so as not to discharge into and upon the electromagnet parts, and so as to be directed into the angularly arranged discharge ducts 45.

The use and operation of my improved reservoir and brake valve will in the main be fully apparent from the detailed description thereof given above. It will be further apparent that by the provision of my present construction the reservoir air may be taken from the pressure chamber 15 and conducted to influence the operating diaphragm 28 without any disturbance of the continued effective operation of the primary valve 32, the efficient functioning and the integrity of the parts being thereby maintained for an extended period of time.

While I have shown my device in the preferred form, it will be obvious that many changes and modifications may be made in the structure disclosed without departing from the spirit of the invention, defined in the following claims.

I claim:

1. A train control mechanism for use with the air brake system of the train comprising a casing provided with two intercommunicating chambers, a control valve for controlling intercommunication therebetween, one chamber comprising a pressure chamber connectable to the reservoir of the air brake system, and the other being adapted for connection to the engineman's brake valve, pneumatic mechanism for operating the control valve including a pneumatically actuated means connected to the control valve, provisions for conducting a flow of reservoir air to said means to influence the same, and a primary valve for controlling said air flow, the said provisions comprising a duct connected to the top of said pressure chamber.

2. A train control mechanism for use with the air brake system of the train comprising a casing provided with two intercommunicating chambers, a control valve for controlling intercommunication therebetween, one chamber comprising a pressure chamber connectable to the reservoir of the air brake system, and the other being adapted for connection to the engineman's brake valve, pneumatic mechanism for operating the control valve including a pneumatically actuated means connected to the control valve, provisions for conducting a flow of reservoir air to said means to influence the same, and a primary valve for controlling said air flow, the said provisions comprising a removable pipe arranged exterior to the casing and connected to said pressure chamber.

3. A train control mechanism for use with the air brake system of the train comprising a casing provided with two intercommunicating chambers, a control valve for controlling intercommunication therebetween, one chamber comprising a pressure chamber connectable to the reservoir of the air brake system, and the other being adapted for connection to the engineman's brake valve, pneumatic mechanism for operating the control valve including a pneumatically actuated means connected to the control valve, provisions for conducting a flow of reservoir air to said means to influence the same, and an electromagnetically controlled primary valve for controlling said air flow, the said provisions comprising a duct connected to the top of said pressure chamber.

4. A combined reservoir and brake valve for use with the air brake system of a train, comprising a casing provided with two intercommunicating chambers, a reservoir valve for controlling the intercommunication therebetween, one chamber comprising a pressure chamber connectable to the reservoir of the air brake system, and the other chamber being adapted for connection to the engineman's brake valve, the said casing being provided with a third chamber adapted for connection to the brake pipe of the air brake system, a brake valve for controlling the flow of air therefrom, pneumatic mechanism for operating the reservoir and brake valves including a pneumatically actuated means connected to the said valves, provisions for conducting a flow of reservoir air to said means to influence the same, and a primary valve for controlling said air flow, the said provisions comprising a duct connected to the top of said pressure chamber.

5. A combined reservoir and brake valve for use with the air brake system of a train, comprising a casing provided with two intercommunicating chambers, a reservoir valve for controlling the intercommunication therebetween, one chamber comprising a pressure chamber connectable to the reservoir of the air brake system, and the other chamber being adapted for connection to the engineman's brake valve, the said casing being provided with a third chamber adapted for connection to the brake pipe of the air brake system, a brake valve for controlling the flow of air therefrom, pneumatic mechanism for operating the reservoir and brake valves including a pneumatically actuated means connected to the said valves, provisions for conducting a flow of reservoir air to said means to influence the same, and a primary valve for controlling said air flow, the said provisions comprising a removable pipe arranged exterior to the casing and connected to said pressure chamber.

6. A combined reservoir and brake valve for use with the air brake system of a train, comprising two superimposed intercommunicating chambers, a reservoir valve therebetween, one of said chambers comprising a pressure chamber connectable to the reservoir of the air brake system and the other of said chambers being connectable to the engineman's brake valve, a third chamber in said casing connectable to the brake pipe of the air brake system, a brake valve for controlling the flow of air therefrom, the said valves being carried by a single stem, pneumatic means for operating the said valves including a diaphragm connected to said stem, provisions for conducting a flow of reservoir air to actuate the diaphragm, and a primary valve for controlling said air flow, said provisions comprising a pipe arranged exterior to the casing and connected to the top of the pressure chamber therein.

7. A train control mechanism for use with the air brake system of the train comprising a casing provided with two intercommunicating chambers, a control valve for controlling intercommunication therebetween, one chamber comprising a pressure chamber connectable to the reservoir of the air brake system, and the other being adapted for connection to the engineman's brake valve, pneumatic mechanism for operating the control valve including a pneumatically actuated means connected to the control valve, provisions connected for conducting a flow of reservoir air to said means to influence the same, and a primary valve for controlling said air flow, the said provisions including means for filtering impurities in the reservoir air to protect the primary valve.

8. A combined reservoir and brake valve comprising a casing including a plurality of ports, a plurality of valves connected for movement in unison for opening and closing said ports, pneumatic mechanism for operating the said valves including a pneumatically actuated means connected to said valves, provisions connected for conducting a flow of air under pressure to said means to influence the same, and a primary valve for controlling said air flow, the said provisions including means for filtering impurities in the air to protect the primary valve, and means for collecting and discharging such impurities.

9. A train control mechanism for use with the air brake system of the train, comprising a casing including a valve means for controlling the flow of air from the reservoir of the air brake system to the engineman's brake valve, pneumatic mechanism for operating the said valve means including a pneumatically actuated means connected to the valve means, provisions connected to the reservoir for conducting a flow of reservoir air to said means to influence the same, and a primary valve for controlling the said air flow, the said provisions including means for filtering impurities in the reservoir air to protect the primary valve, and means for collecting and discharging such impurities.

10. A train control mechanism for use with the air brake system of the train comprising a casing, valve mechanism therein, pneumatic mechanism for operating the valve mechanism including a pneumatically actuated means connected to the valve mechanism, provisions for conducting a flow of air under pressure to said means, discharge duct means, and a primary valve for controlling the flow of air under pressure to said pneumatically actuated means and the flow of air therefrom to said discharge duct means, an electromagnet for operating the said primary valve, said primary valve including a deflector for deflecting the discharge air away from said electromagnet and to the said discharge duct means.

11. A train control mechanism for use with the air brake system of the train comprising a casing, valve mechanism therein, pneumatic mechanism for operating the valve mechanism including a pneumatically actuated means connected to the valve mechanism, provisions for conducting a flow of air under pressure to said means, discharge duct means, a primary valve for controlling the flow of air under pressure to said pneumatically actuated means and the flow of air therefrom to said discharge duct means, an electromagnet for operating the said primary valve, and a deflector between said primary valve and said electromagnet for deflecting the discharge air away from said electromagnet and to the said discharge duct means.

Signed at Niagara Falls, in the county of Niagara and State of New York, this 6th day of November, A. D. 1922.

ALLEN B. KENDALL.